(12) United States Patent
Gilmore

(10) Patent No.: US 10,010,914 B1
(45) Date of Patent: Jul. 3, 2018

(54) SELF CLEANING WATER PIPE

(71) Applicant: Jonathan Richard Gilmore, Newbury Park, CA (US)

(72) Inventor: Jonathan Richard Gilmore, Newbury Park, CA (US)

(*) Notice: Subject to any disclaimer, the term of this patent is extended or adjusted under 35 U.S.C. 154(b) by 0 days.

(21) Appl. No.: 15/482,253

(22) Filed: Apr. 7, 2017

(51) Int. Cl.
| | |
|---|---|
| *A24F 1/30* | (2006.01) |
| *B08B 17/02* | (2006.01) |
| *C02F 1/28* | (2006.01) |
| *A24F 1/02* | (2006.01) |
| *A24F 3/00* | (2006.01) |
| *A24F 3/02* | (2006.01) |

(52) U.S. Cl.
CPC ............... *B08B 17/02* (2013.01); *A24F 1/02* (2013.01); *A24F 3/00* (2013.01); *A24F 3/02* (2013.01); *C02F 1/283* (2013.01)

(58) Field of Classification Search
CPC ............. A24F 1/30; A24F 3/02; A24F 9/04
See application file for complete search history.

(56) References Cited

U.S. PATENT DOCUMENTS

| | | | |
|---|---|---|---|
| 3,881,499 | A | 5/1975 | McFadden et al. |
| 8,534,296 | B2 | 9/2013 | Groff |
| 2007/0261194 | A1* | 11/2007 | Tannous ................ A24F 1/30 15/330 |
| 2013/0104738 | A1 | 5/2013 | Goldstein |

OTHER PUBLICATIONS

Shroomery.org; World of Mushrooms; Aug. 17, 2012.
Ktremesystems.org (Google Images); my water bong—pics; Feb. 27, 2003.
Diysrc.com; UberBong—A New High in Cpu Cooling; retrieved Feb. 20, 2015.

* cited by examiner

*Primary Examiner* — Eric Yaary
(74) *Attorney, Agent, or Firm* — Kelly & Kelley, LLP

(57) ABSTRACT

The present invention is directed to a self-cleaning water pipe including a secondary pipe that directs a stream of filtered water to the top of the main pipe. The stream of water is introduced to the main pipe proximate or adjacent to the mouthpiece in a lateral direction so as to cover the entire inner surface of the main pipe with a water membrane. The water membrane presents a barrier to smoke residue and particulates from being deposited on the inner surface of the main pipe. A tertiary pipe may also introduce a stream of water to a downstem pipe so as to create a similar water membrane in the downstem pipe.

20 Claims, 9 Drawing Sheets

SELF CLEANING WATER PIPE

BACKGROUND OF THE INVENTION

The present invention is directed to a water pipe smoking device. More particularly, the present invention is directed to a self-cleaning water pipe that aids in preventing residue and particulates found in smoke from depositing on the interior surfaces of the smoking device.

People have been using water filtered smoking apparatuses for thousands of years. Most smokers that use the water pipe as their primary smoking device enjoy the large volume of smoke that is possible to intake in a single breath of air, allowing for more potent draws with less time.

Problems with the common water pipe smoking device are that it is susceptible to getting filthy fast. Once the apparatus is dirty, smokers tend to shy away from using the device because of the foul odors it emits as well as the additional harshness that breathing in foul odors entails. In addition, the water pipe will look visibly dirty to the point of being unsanitary, and will require immense time and effort to keep clean.

Traditional water pipe smoking devices consist of a main pipe having a volume of water in the bottom thereof. A top of the main pipe has a mouthpiece and a downstem passes through the side of the main pipe at or below the surface of the volume of water.

A material to be smoked, e.g., tobacco or herbs, is burned in a bowl attached to the downstem. When a user draws a breath on the mouthpiece, the smoke from the burning material is drawn through the downstem and into the volume of water. The smoke the passes through the water, exiting the surface into the interior of the main pipe. Further inhalation draws the smoke through the mouthpiece and into the user's mouth or lungs depending upon how deeply the user inhales.

Through the routine use of a water pipe, residue and particulates present in the smoke are deposited on interior surfaces of the water pipe. The residue and particulates deposited on the interior surfaces give the water pipe a cloudy, dirty, and unclean appearance, particularly in the case of transparent or translucent glass or plastic water pipes. Depending upon how frequently such residue and particulates are cleaned, the same may be difficult or impossible to remove. The surface may also be permanently stained with some of the residue.

In addition, some water pipes are too narrow and/or too fragile to clean by hand. A person seeking to clean the interior surfaces of a water pipe may not be able to reach their hand into the interior of the main pipe. While brushes and similar tools may be able to reach into smaller pipes, the residue and/or particulates may be caked on too strongly to remove without additional pressure. Furthermore, the water pipe may be constructed out of fragile material that could not withstand the vigorous pressure needed to remove some caked on residue and particulates.

Accordingly, there is a need for a water pipe that prevents deposition of residue and/or particulates from interior surfaces thereof, or, in the alternative, makes it easier to remove the same. The present invention fulfills these needs and provides other related advantages.

SUMMARY OF THE INVENTION

The present invention is directed to a self-cleaning water pipe that presents a barrier to smoke residue and particulates from being deposited on interior surfaces of the water pipe. An object of the present invention is to aid in keeping a water pipe clean over extended periods of time. Another object of the present invention is to aid in keeping the water in a water pipe clean over extended periods of time. A further object of the present invention is to present smoother smoke draws from a water pipe because of reduced exposure of the smoke to debris in the water. A still further object of the present invention is to produce a cooler smoke because of increased surface area contact and motion between the water and the smoke. Yet, a still further object of the present invention is to provide a more aesthetically pleasing water pipe over longer durations of use.

The present invention is directed to a self-cleaning water pipe apparatus. The apparatus includes a typical water pipe consisting of a main pipe having a smoke chamber with a mouthpiece at a first end and a water chamber at a second end. The mouthpiece, smoke chamber, and water chamber are all in fluid communication being contained within the same continuous main pipe. A downstem pipe passes through the side wall of the main pipe with a first end of the downstem pipe being adapted to receive a burn bowl and a second end being in fluid communication with the water chamber.

The improvement of the present invention includes a filter unit in fluid communication with the water chamber, and a pump unit in fluid communication with the filter unit. A secondary pipe has a first end in fluid communication with an outlet from the pump unit and a second end connected to a secondary inlet on the main pipe proximate to the mouthpiece. The secondary inlet is in fluid communication with the smoke chamber.

The secondary inlet is preferably connected to the main pipe immediately adjacent to the mouthpiece. The secondary inlet is preferably connected to the main pipe at an approximately tangential angle relative to a side of the main pipe. The secondary pipe and inlet is further is configured to inject water into the smoke chamber in a generally lateral orientation relative to a central axis of the main pipe. For ease of configuration, the secondary pipe preferably wraps around the main pipe in a helix.

The self-cleaning water pipe may further include a tertiary pipe having a first end in fluid communication with the pump unit and a second end connected to a tertiary inlet proximate to the first end of the downstem pipe. The tertiary inlet is in fluid communication an interior of the downstem pipe. The first end of the tertiary pipe is preferably connected to the secondary pipe proximate to the pump unit.

The pump unit is preferably adapted to force liquid through the secondary pipe to the secondary inlet under sufficient pressure such that the liquid swirls completely around an interior surface of the smoke chamber proximate to the mouthpiece.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
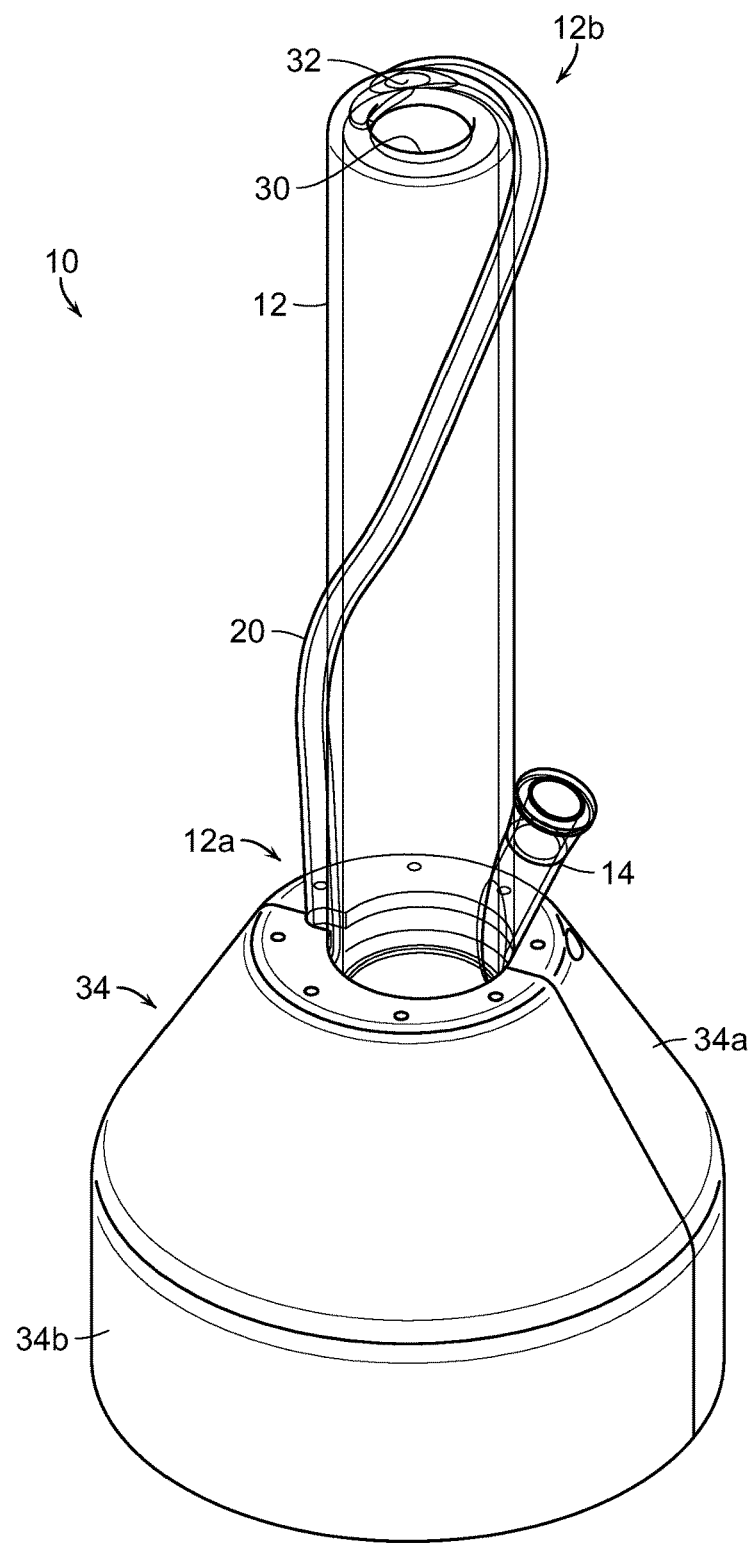
FIG. 1 is a perspective view of the self-cleaning water pipe of the present invention.
Figure 2:
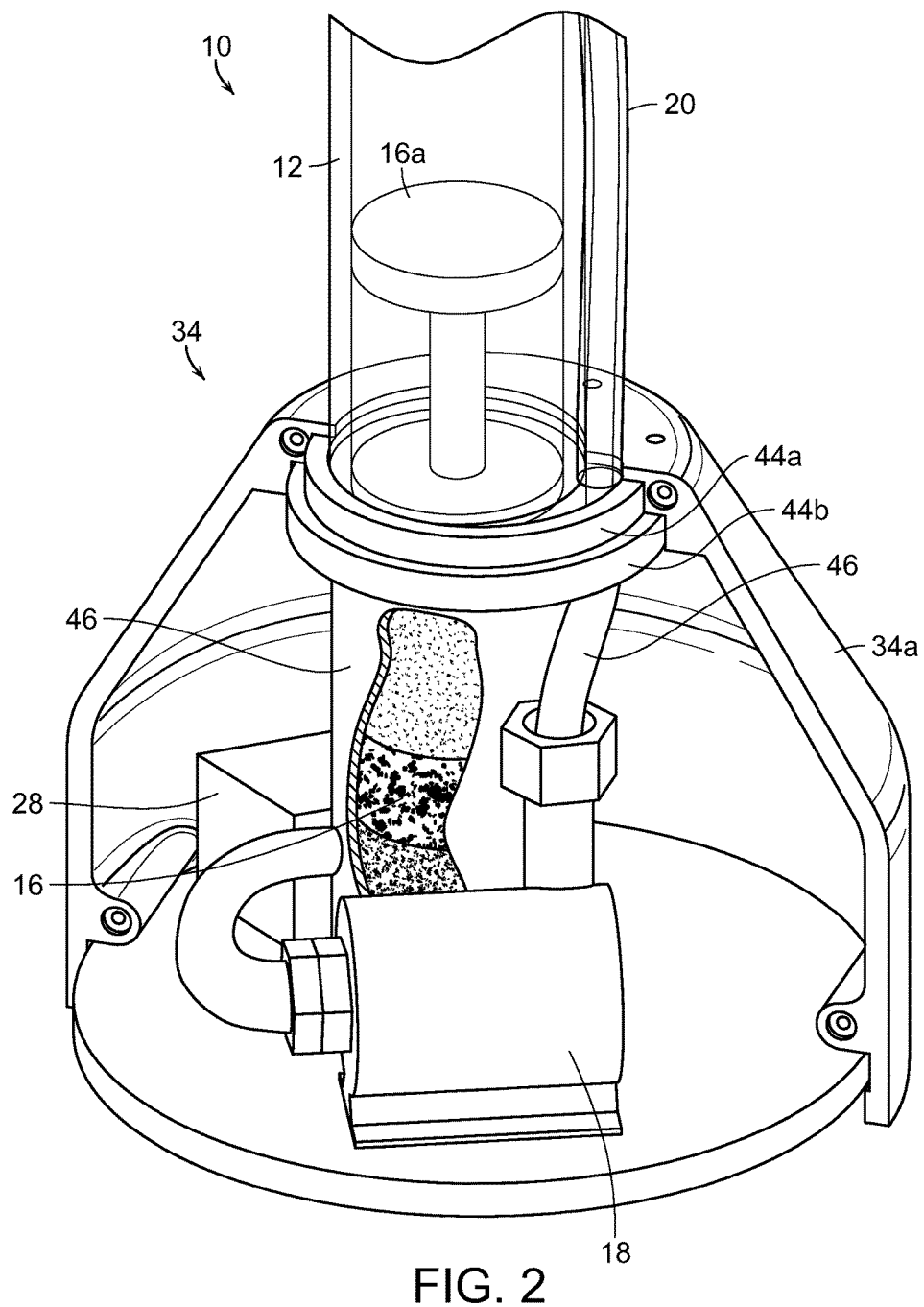
FIG. 2 is a cut-away view of a base unit of the self-cleaning water pipe of the present invention.
Figure 3:
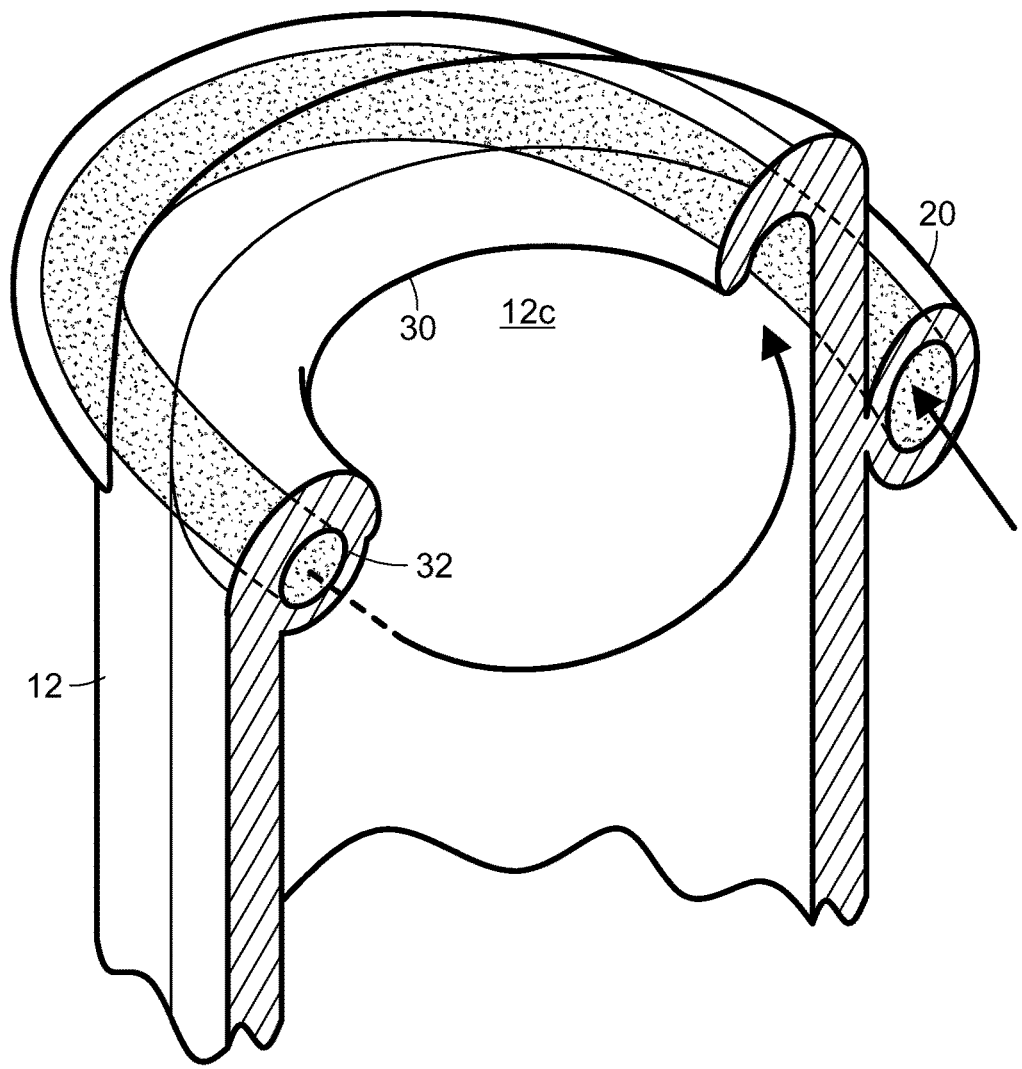
FIG. 3 is a close-up, cut-away view of the mouthpiece and secondary pipe inlet of the self-cleaning water pipe of the present invention.

In the following detailed description, the self-cleaning water pipe of the present invention is generally referred to by reference numeral 10 in FIGS. 1-8. The individual components of the water pipe 10 represent the main pipe 12, the downstem pipe 14, a filter unit 16, a pump unit 18, and a secondary pipe 20.

Figure 4:
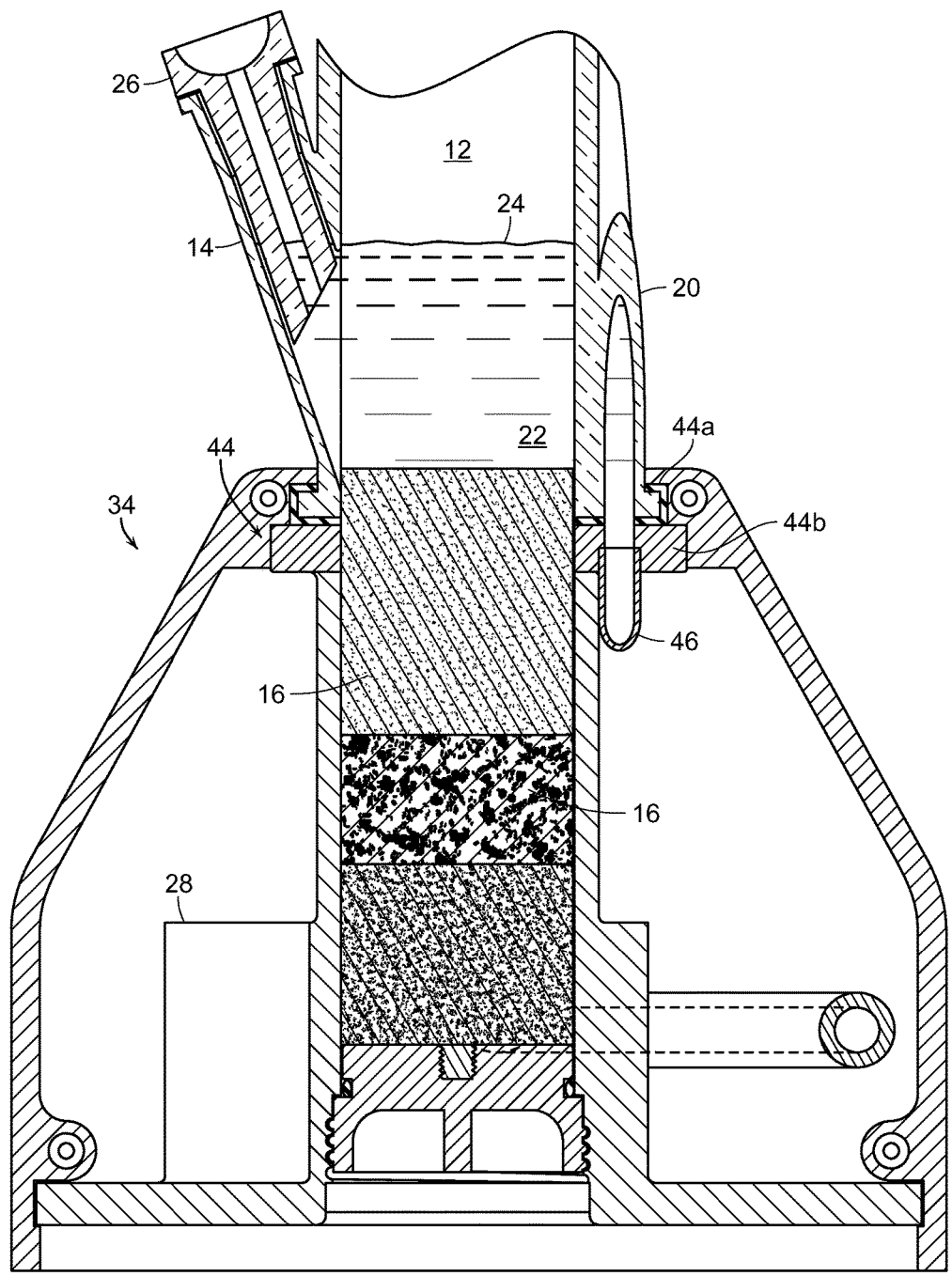
FIG. 4 is a cross-sectional view of the base unit and water chamber of the self-cleaning water pipe of the present invention.
Figure 5:
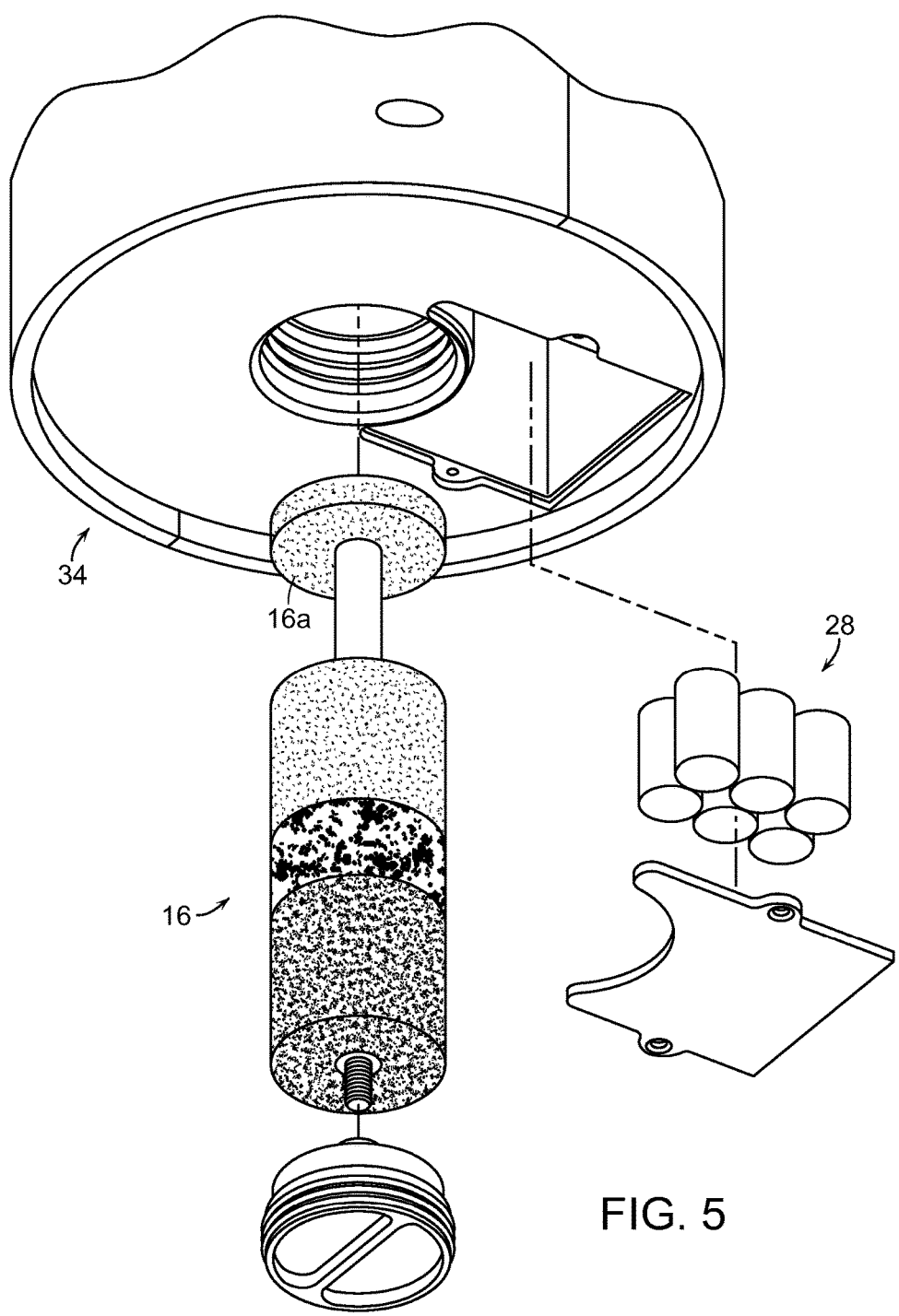
FIG. 5 is a partially exploded view of the filter unit, battery compartment, and base unit of the self-cleaning water pipe of the present invention.

As shown in FIGS. 1 and 4, the self-cleaning water pipe 10 is similar to other water pipes meant for smoking, in that it uses a main pipe 12 to hold water in a water chamber 22 in a lower end 12a thereof. The downstem tube 14 enters the main pipe 12 at or below the water level 24 so that its inlet is submerged in the water and the smoke is channeled through the water and into the main tube 12. A burn bowl 26 or similarly shaped piece fits into the downstem pipe 14 and holds the material to be smoked.

As shown in FIGS. 2-5, the self-cleaning water pipe 10 is different from conventional smoking pipes because it includes the filter unit 16, the pump unit 18, and a power source 28. In addition, the water is preferably low in initial particle content (measured by parts per million, or PPM), as in water that has been filtered via reverse osmosis or similar process.

The water begins in the water chamber 22 at the base of the main pipe 12. This water chamber 22 is connected to both the main pipe 12 and the filter unit 16. The filter unit 16 is positioned in the bottom of the water chamber 22 or in an adjacent chamber (not shown). The pump unit 18 is preferably positioned "downstream" of the filter unit 16 such that all water moved by the pump unit 18 is drawn through the filter unit 16. This assures that the water is purified and cleaned before it is cycled through the self-cleaning water pipe 10 as described below. The output of the pump unit 18 directs the water into the secondary pipe 20, which is connected to the top end 12b of the main pipe 12 adjacent to a mouthpiece 30.

Figure 6:
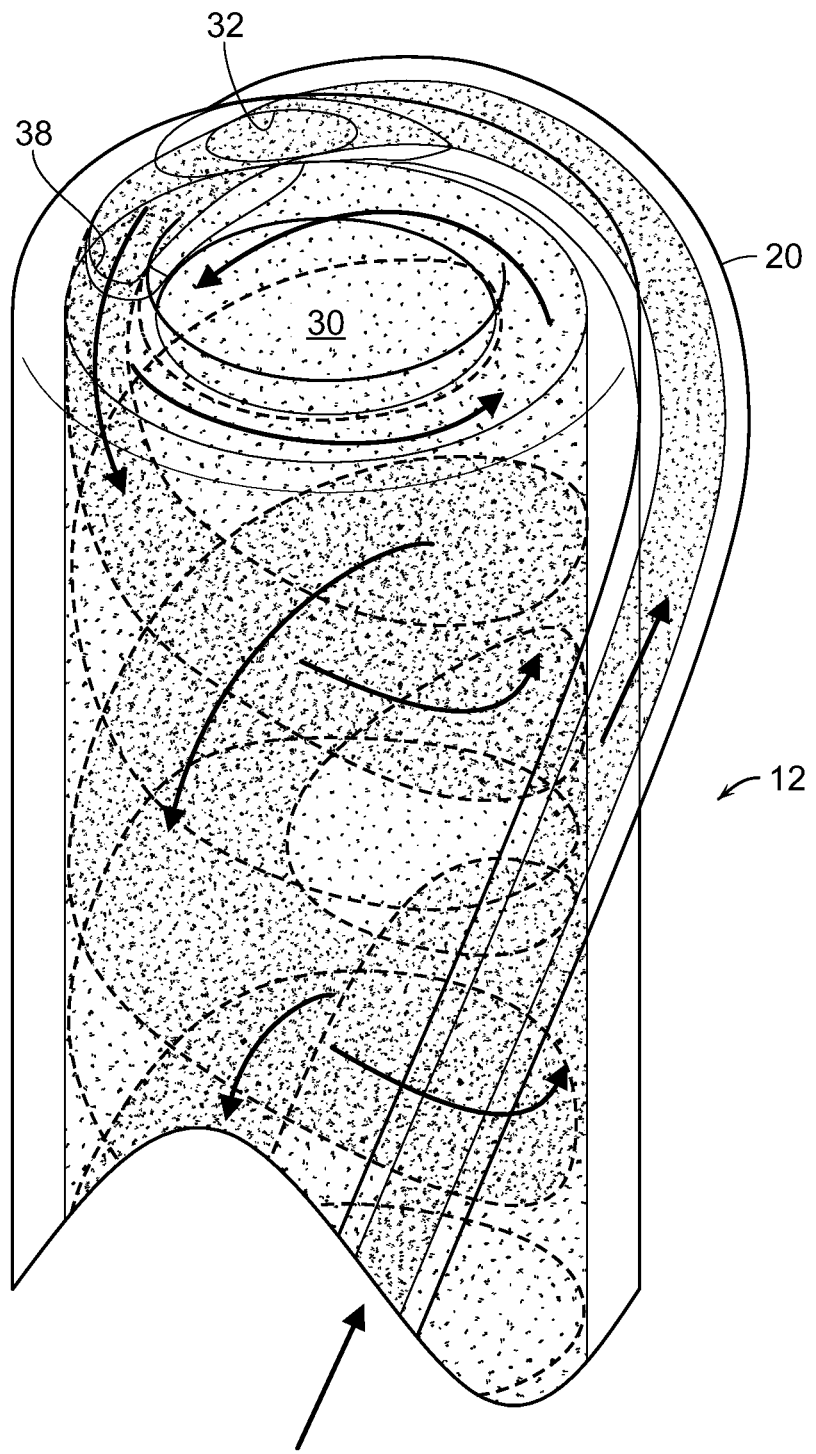
FIG. 6 is an environmental view of and upper portion of the self-cleaning water pipe of the present invention illustrating the flow of water through the secondary pipe.

When the pump unit 18 is turned on, the water is drawn through the filter unit 16 by the pump unit 18. The water is forced through the pump unit 18 and is directed upward through the secondary pipe 20 the top 12b of the water pipe 10, proximate to the mouthpiece 30 where the smoker inhales the smoke. As shown in FIG. 6, the water from the secondary pipe 20 is directed through a secondary inlet 32 to the inside surface 12c of the main pipe 12. After moving across the inside surface 12c of the main pipe 12 and cascading down the sides to the water chamber 22, the water is drawn back through the filter unit 16 by the pump unit 18, and the cycle repeats as long as the pump unit 18 is turned on.

Every time the smoker wishes to use the self-cleaning water pipe 10, they simply need to turn on the pump unit 18, smoke out of the water pipe 10, and turn off the pump unit 18 when they are done. As long as the pump unit 18 is on, the water constantly moves through the filter unit 16 in order to keep the water clean.

While in operation, water preferably covers the entire inside surface 12c of the main pipe 12. Because of the barrier created by the water covering the entire inside surface 12c, the smoke never touches the inside surface 12c of the main pipe 12. As soon as residue and particulates in the smoke touch the cascading water, the same are immediately pulled downward with the water away from the inside surface 12c and through the filter unit 16, where the residue and particulates are then removed from the water and trapped.

The water pipe 10 can be made to either plug into a wall outlet (not shown), or be powered a battery 28 on board the water pipe 10. The filter unit 16 is preferably changed periodically in order to keep the water fresh and the pump unit 18 operating smoothly. The water should also be changed periodically in order to further minimize deposition of residue and particulates on the inside surface 12c.

The self-cleaning water pipe 10, consists mainly of the standard components of a basic water pipe 10a (main pipe 12 and downstem pipe 14), along with a base attachment 34 (including the filter unit 16, the pump unit 18, the secondary pipe 20, power source 28, and secondary inlet 32). The basic water pipe 10a should be connected to the base attachment 34 through conventional means (rubber grommets, screws, clamps, fasteners, etc.). The connection of these two features must be completely water and air-tight to prevent spillage and air leakage.

As mentioned above, the water used in the water pipe 10 is preferably low in particle content. Specifically, it should be low in salts and residue before being placed in the water chamber 22. This is crucial to maintaining a clean water pipe 10. If the water contains excess salt and mineral content, the salts and mineral content will deposit on the inside surface 12c of the main pipe 12 during periods when the water pipe 10 is not being used. Droplets will form on the inside surface 12c of the main pipe 12 once the pump unit 18 is turned off. These droplets will leave the salts and minerals behind as an undesirable residue once they dry through evaporation.

The most preferred water to use is reverse-osmosis (0 PPM) filtered water, in order to minimize deposits of salts or minerals on the glass. However, certain measures must be taken when using reverse-osmosis purified water in the inventive system because certain materials used in the pump unit 18 and the water pipe 10a could be dissolved by such water. It is also preferred to use a wetting agent in the water, to reduce the natural surface tension of the reverse osmosis water. Wetting agents allow the water to move freely through the pump unit 18 and secondary pipe 20, as well as, aiding in dissolving residues from the smoke.

The secondary pipe 20, secondary inlet 32, and mouthpiece 30, are preferably connected fluidly connected to each other through conventional means, e.g., screws, clamps, fasteners, etc. More preferably, the secondary pipe 20, secondary inlet 32, and mouthpiece 30, may be crafted onto the single piece. Most preferably, the inventive design consist of the main pipe 10, the downstem pipe 14, the secondary pipe 20, the mouthpiece 30, and the structure to connect the water pipe 10a to the base 34 as part of a single "pipe apparatus" constructed entirely out of glass. This allows assembly to be streamlined, and the unit to look more aesthetically pleasing.

The main pipe 12 is where the smoke collects above the level of the water 24 and passes through on each inhale. The inventive design has the main pipe 12 being a generally straight cylinder of glass; however it could also be made of plastic or metal. The inside surface 12c needs to be smooth so that water freely flows over it from top 12b to bottom 12a. No irregularities should be present so as to not interrupt the uniform flow of water down the sides 12c of the pipe 12.

Figure 7A:
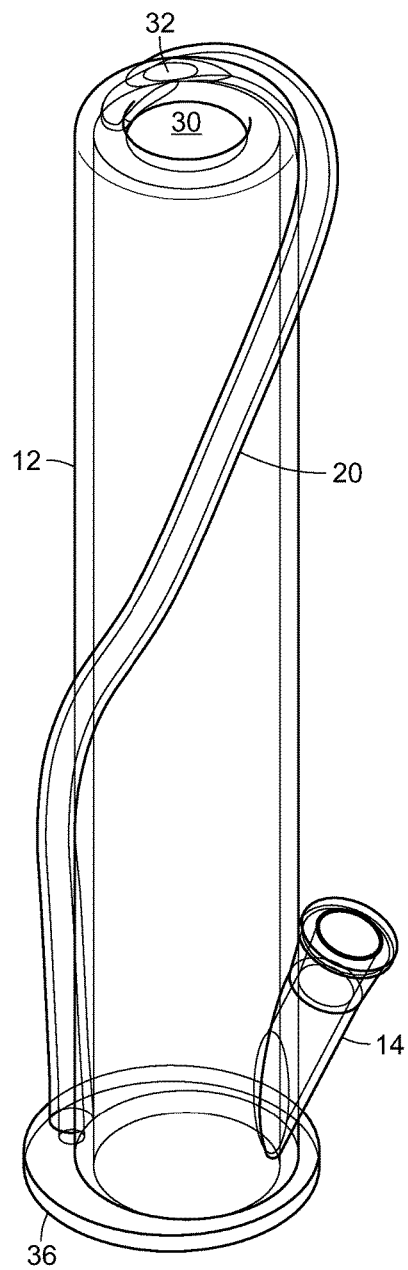
FIG. 7A is an illustration of the secondary pipe partly wound around the main pipe of the self-cleaning water pipe of the present invention.
Figure 7B:
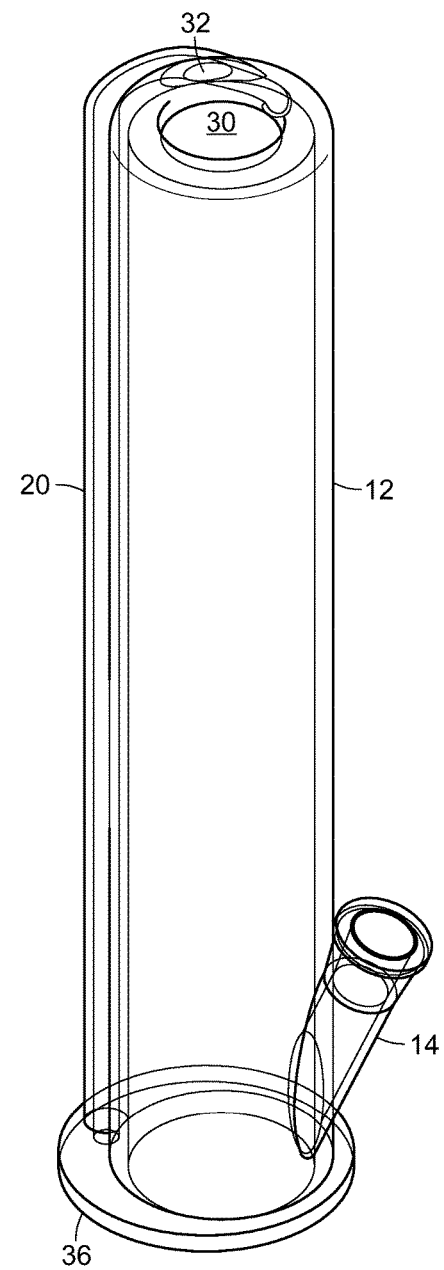
FIG. 7B is an illustration of the secondary pipe running straight up the main pipe of the self-cleaning water pipe of the present invention.
Figure 7C:
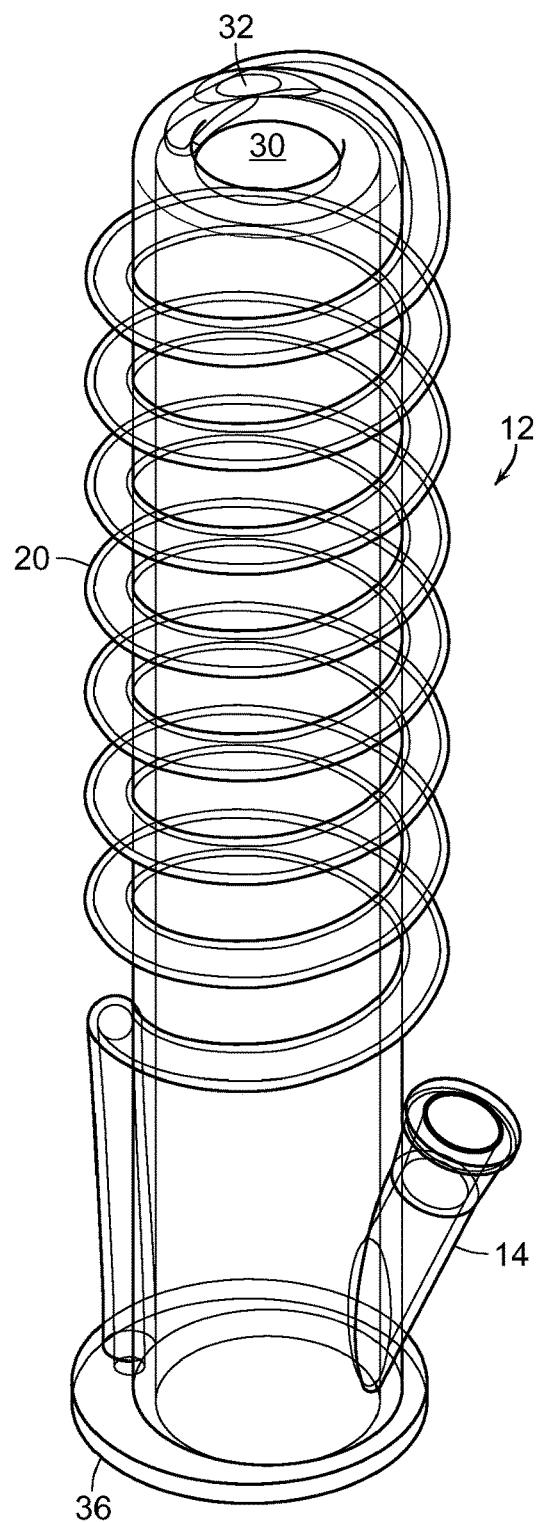
FIG. 7C is an illustration of the secondary pipe wound in a helix around the main pipe of the self-cleaning water pipe of the present invention.

As shown in FIG. 7B, the secondary pipe 20 may be straight such that it runs effectively parallel to the main pipe 12. In this case, the secondary pipe 20 would lead to a 90-degree bend for the secondary inlet 32 at the mouthpiece 30. The benefits of a straight run secondary pipe 20 is that it requires less material to produce, and may be easier to manufacture. Alternatively, as shown in FIG. 7A, the secondary pipe 20 may wind around the main pipe 12 for a softer turn (less than 90-degree) into the secondary inlet 32. Most preferably, as shown in FIG. 7C, the secondary pipe 20 may wrap around the main pipe 12, in a smooth radial pattern that would reduce the vertical movement of the water in relation to the lateral movement of the water (e.g., less steep slope) as the water is pumped to the top of the main pipe 12. Ideally, the secondary pipe 20 would generally resemble a helix. In a particularly preferred embodiment, the distance between each rotation would decrease as the secondary pipe 20 gets closer to the top end 12b of the main pipe 12. [Para 41] Eventually, the secondary pipe 20 reaches the secondary inlet 32 where the water is dispensed at the mouthpiece 30 onto the inside surface 12c. The secondary inlet 32 preferably passes through the side of main pipe 12 or the mouthpiece 30 as a shallow angle relative to a tangent to the cylindrical shape. The intention is to introduce the water onto the inside surface 12c at an angle and with sufficient velocity that the water completes a full revolution around the inside surface 12c of the main pipe 12 before gravity begins to drag the water toward the bottom end 12a. This assures more complete coverage of the inside surface 12c so as to present a barrier against residue and particulates over nearly the entire inside surface 12c. By eliminating 90-degree angles and similarly sharp bends with a radial directionality around the main pipe 12, sources of friction caused by such bends can be eliminated so as to not reduce the velocity of the water leaving the secondary inlet 32.

The bottom 12a of the main pipe 12 is where the three pipes—the main pipe 12, the downstem pipe 14, and the secondary pipe 20—connect with the base 34. The main pipe 12, the downstem pipe 14, and the secondary pipe 20 may be formed (e.g., blown glass pieces) together with a flange 36—glass or rubber. The flange 36 that is attached to the pipes would incorporate openings to accommodate each pipe 12, 14, 20, and would encircle all three pipes within its own diameter with an additional margin.

As described above, the orientation of the secondary inlet 32 relative to the mouthpiece 30 and inside surface 12c is extremely important. The secondary inlet 32 needs to propel water laterally along the inside surface 12c of the main pipe 12. Firstly, the pump unit 18 must be sufficiently strong to propel the water to the top 12b of the main pipe 12, as well as, across the entire inside surface 12c of the main pipe 12, so that the water does not fall down the inside surface 12c under the force of gravity before completing one revolution of the inside surface 12c. The water completing one revolution of the inside surface 12c must "meet" the water that is being propelled from the secondary inlet 32 before cascading down the inside surface 12c by the force of gravity. By ensuring the water completes one revolution around the entire inside surface 12c at the top 12b of the main pipe 12, lateral to the central axis of the main pipe 12, the water will create a continuous liquid membrane along the entire inside surface 12c from the mouthpiece 30 to the level of water 24 in the bottom 12a of the main pipe 12. The liquid membrane creates a barrier between the residue and particulates of the smoke and the inside surface 12c of the main pipe 12.

The secondary inlet 32 adjacent to the mouthpiece 30 is preferably positioned directly beneath where the user places their mouth. This is because a person using the water pipe 10 will often tilt it toward them in order to keep from having to bend their backs in an uncomfortable position while smoking. By this bending motion, the water will be directed out of the secondary inlet 32 at a slightly different angle than when the water pipe 10 is positioned perfectly upright. If this angle is too steep and the secondary inlet 32 is incorrectly placed, then the water may be propelled slightly downward such that it will not coat the entire inside surface 12c of the main pipe 12. If this happens, a portion of the inside surface will not be protected by the "liquid membrane" and the unit will not stay as clean in that exposed area.

Since such tilt is typically toward the smoker, the optimum placement of the secondary inlet 32 is just below where the smoker puts their mouth on the mouthpiece 30. When tilting the water pipe 10 to a more comfortable position, the water from the secondary inlet 32 will be directed sideways along the inside surface 12c of the main pipe 12 if the secondary inlet 32 is below the smokers mouth. This will allow the water to completely encircle the inside surface 12c without losing momentum, still effectively covering the entire inside surface 12c of the main pipe 12—even when tilted for use. This is the best way to ensure the water will adequately cover the inside surface 12c of the main pipe 12 in the case of tilting.

The connection between the secondary pipe 20 and the mouthpiece 30 is preferably of a very particular shape. The secondary pipe 20 must penetrate the top 12b of the main pipe 12 at a generally horizontal orientation and perpendicular to the direction of the central axis of the main pipe 12. This causes the outermost side of the secondary pipe 20 (outermost in terms of relative distance from the central axis of the main pipe 12) meets the inside surface 12c of the main pipe 12 with a continuous surface. The secondary inlet 32 in the secondary pipe 20 preferably aligns precisely with the inside surface 12c of the main pipe 12. Alternatively, the secondary pipe 20 can become part of a "channel mechanism" such that it completes another rotation around the inside surface 12c of the main pipe 12 above the mouthpiece 30, to allow its outermost side to act as a pathway to guide the water flow. In either case the secondary inlet 32 must be located at a point on the inside surface 12c that is closest to the smoker's mouth.

The secondary inlet 32 may be integral with the mouthpiece 30 such that the mouthpiece 30 includes a path 38 along the top of the inside surface 12c of the main pipe 12, where the secondary pipe 20 and main pipe 12 meet. This path 38 is preferably semi-tubular or annular in shape, e.g., a donut with the bottom and insides removed. The path 38 will channel the water around the inside surface 12c without allowing it to spill or splash outward. This is another component that requires refinement. If the path 38 that directs the water to flow around the inside surface 12*c* of the main pipe 12 sufficiently directs the water so that it is guided along with minimal friction, than the size of the pump unit 18 can be minimized and the overall cost can be reduced.

With enough water volume moving through the secondary pipe 20, the inventive system will effectively coat the inside surface 12*c* of the main pipe 12 with a water barrier until it reaches the water chamber 22 at the bottom 12*a* of the main pipe 12. If the water volume that is being pumped through the secondary pipe 20 is too low, then the cascade won't entirely coat the inside surface 12*c* of the main pipe 12. Instead, it will bead up or gaps before the water reaches water level 24 in the water chamber 22. This would be problematic because the inside surface 12*c* would be exposed to residue and particulates in the gap areas.

As described above, the water is then drawn from the water chamber 22 through the filter unit 16 and sent back through the pump unit 18 to repeat the cascade cycle again. The action is cyclical, meaning once the system is going, it will continue going until the pump unit 18 is shut off.

As with prior water pipes 10*a* in general, smoke is drawn into the main pipe 12 by conventional means, e.g., smoking material is burned in the bowl 26, passes through the downstem pipe 14, through the water in the water chamber 22, and up the main pipe 12 to the mouthpiece 30. The bowl 26 is connected to the downstem pipe 14 by means of a glass-on-glass connection. Once connected, an opening at the bottom of the bowl 26 passes smoke into the downstem pipe 14. The downstem pipe 14 also connects to the water chamber 22 with a typical glass-on-glass connection to feeds the smoke into the water chamber 22. It is important that the outlet on the downstem pipe 14 is completely submerged in the water chamber 22, in order to properly filter and cool the smoke. It is also important that the downstem pipe 14 isn't submerged too deep into the water chamber 22, in order to ensure no smoke gets captured in the forms of the pump unit 18.

Figure 8:
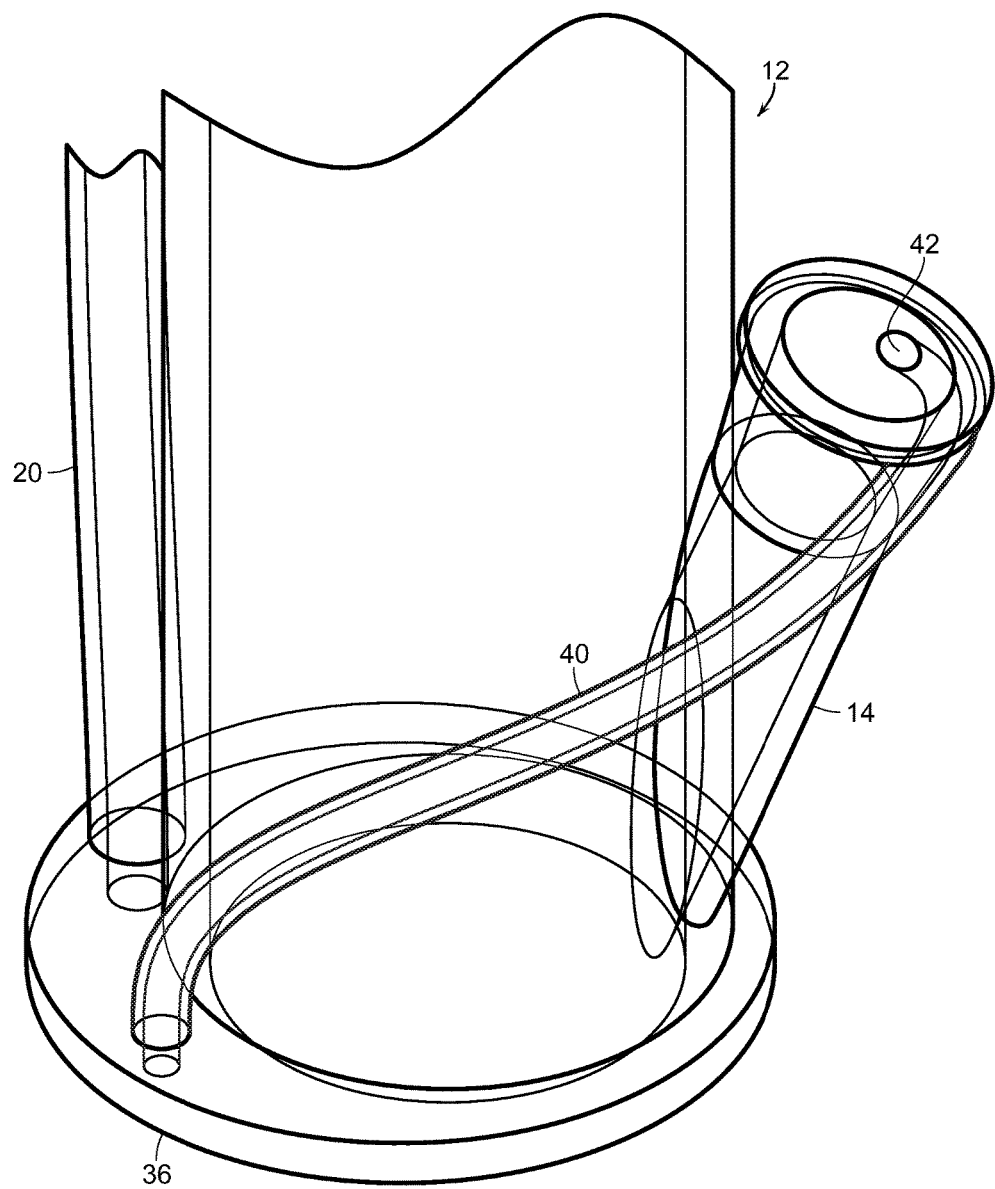
FIG. 8 is a close-up view of the downstem including the tertiary pipe of the self-cleaning water pipe of the present invention.

If it is also desired to keep the downstem pipe 14 cleaned, then the same may be connected to the filter unit 16 and the pump unit 18 by a tertiary pipe 40, and a tertiary inlet 42 so that the inside surface 14*c* of the downstem pipe 14 is also coated with a water barrier. As shown in FIG. 8, the tertiary pipe 40 may run from a secondary outlet (not shown) on the pump unit 18, or split from the secondary pipe 20 as by a T-junction or similar connector. If the tertiary pipe 40 is included in the water pipe 10, it will preferably operate in a similar manner as described above for the secondary pipe 20 and secondary inlet 32 so as to achieve a water pipe 10 that stays clean from the bowl 26 to the mouthpiece 30 for much longer durations of time.

The downstem pipe 14 preferably is a permanent part of the water pipe 10*a* and is accomplished by connecting the downstem pipe 14 to the main pipe 12, so that the downstem pipe 14 ends flush with the inside surface 12*c* of the main tube 12 in the water chamber 22. Assuming the water level 24 is above this downstem inlet, the downstem pipe 14 would then be able to transmit smoke through water without having an intruding glass tube. Such an intruding glass tube that enters the water chamber could interfere with replacing the filter unit 16 is the same is replaced by lifting through the top 12*b* of the main pipe 12. In this case, if the downstem pipe 14 does not protrude into the water chamber 22, then the filter unit 16 can encapsulate the downstem inlet by extending farther upward in the water chamber 22 than the downstem inlet. This would allow easy access to the filter unit 16 without having to worry about damaging the downstem pipe 14 during filter replacement. This configuration would also allow the downstem pipe 14 to be cleaned using the cyclical water system described above, and be connected directly to the main tube.

The base attachment 34 houses the pump unit 18, the battery 28, the filter unit 16, as well as, all miscellaneous electrical parts (switches, wiring, and power ports), and holds the main pipe 12 in place relative to the filter unit 16 and other downstream components. One preferred assembly for the base attachment 34 is by using two separate portions 34*a*, 34*b* manufactured from plastic or similarly rigid material. The base attachment 34 can be dissected in halves or other proportions. Preferably, a first portion 34*a* would house or contain most of the components, e.g., main pipe 12, filter unit 16, pump unit 18, battery 28, and other electronics. The first portion 34*a* would also contain any tubes to connect the pump unit 18 to the corresponding secondary pipe 20 and/or tertiary pipe 40. In this case, the second portion 34*b* would simply enclose an opening in the first portion 34*a* and would be designed to cover the components. Alternatively, the various components contained within the base attachment 34 could be divided in any other matter among the first and second portions 34*a*, 34*b*.

The second portion 34*b* could attach to the top, bottom, or side of the first portion 34*a* depending upon how the same is configured. Mounting on the bottom has been found to improve aesthetics. Mounting on the side or top has been found to improve strength and security. Regardless, the second portion 34*b* will be very helpful for preserving the different parts in the base attachment 34, as well as expedite assembly. If the base attachment 34 is configured with top and bottom portions, the bottom portion should be reinforced.

The miscellaneous electrical parts discussed above might include a battery/charging port, PCI, integrated circuit board, wiring, and switches that are known to those skilled in the art of similar electrical devices. They would preferably be mounted proximate to the pump unit 18 and should be sealed to protect from possible water leakage. Wiring may be fed through the topmost part of a wall around the filter unit 16, which is preferably in the center of the base attachment 34, and would connect with the pump unit 18 on the other side of the wall. The PCI and Charging port could be wired together, and placed in a specialized port above the battery 28. A hole in the battery compartment would allow power to feed through to the PCI, power switch, and pump unit 18. The battery 28 is preferably held in the battery port with a screws and a grommet. In an alternative design, the battery 28 could be removable as by a removable cover.

The filter unit 16 would also preferably fit into the base attachment 34, as through a hole in the bottom side. The filter unit 16 may be maintained in the base attachment 34 through a cover that either has mating threads for a threads on the inside of the hole, screw holes so that the cover could be mounted with screws, or lugs and channels.

The pump unit 18 would preferably connect to the base attachment 34 though universal threaded connectors. The inlet of the pump unit 18 would meet the plastic end of a corresponding feed tube from the filter unit 16, and a threaded cap would come over the top of the inlet and thread directly onto the threads on the pump. This type of connection allows the pump unit 18 to be stationary as it is fastened to the base attachment 34, which saves space and makes assembly easier. The outlet of the pump unit 18 would connect to the secondary pipe 20 and/or tertiary pipe 40, either directly or through corresponding plastic guide tubes passing out of the base attachment 34.

The base attachment 34 can be made out of a wide variety of materials, but it must join the main pipe 12, pump unit 18, filter unit 16, battery 28, and secondary pipe 20. The battery 28 and pump unit 18 may be attached to the base attachment 34, or may be entirely enclosed in the base attachment 34, since repeated access to these components are less necessary. The battery 28 must be entirely sealed so as to minimize any chance of exposure to water, which may damage or destroy the unit.

The preferred way to connect the base attachment 34 and the main pipe 12 would be with 2 rubber grommets 44 designed to completely enclose and seal the flange on the bottom of the main pipe 12. Preferably, these grommets 44 accommodate the main pipe 12, the secondary pipe 20, and the tertiary pipe 40 (when present). The base attachment 34 would preferably have two or three guiding pipes 46, consisting of plastic piping that extends several centimeters from the surface of the base attachment 34, and would correlate with the diameters of the pipes 12, 20, 40, in order to place the pipe apparatus securely into the base.

The first grommet 44a on the main pipe 12 would include openings for the guiding pipes 46, and would fit into the base attachment 34 over the top of the guiding pipes 46 at the exact diameter of the flange on the main pipe 12. The main pipe 12 is then fitted into the guiding pipes 46 so that the flange rests on the first rubber grommet 44a and over the guiding pipes 46. The second grommet 44b would then cover the glass flange with a slightly excess margin, e.g., roughly ¼" margin.

In a particularly preferred embodiment, the base attachment parts 34a, 34b would surround and enclose the grommets 44a, 44b to secure the main pipe 12 to the base attachment 34. In an alternative embodiment, a bracket (not shown) could fit over the top of the grommets 44a, 44b and would be secured by screws that feed directly into the base attachment 34. The bottom part of the bracket would include either holes meant for screws that would correspond with threaded holes in the base attachment 34, or the bracket would include a threaded end to engage mating threads on the base attachment 34. Any of these methods of attachment allows the main pipe 12 to be tightened directly into the base attachment 34 without excess pressure being applied, which minimizes the risk of fracturing or breaking in the main pipe 12. One advantage of the later methods is that either of the screw thread attachments would allow the main pipe 12 and base attachment 34 to be separated without opening the base attachment 34.

In a particularly preferred embodiment, the pump unit 18 is a battery operated pump having a battery 28 encased therein. This encased battery 28 would allow the apparatus 10 to be used in any location without being tied to an electrical outlet. In addition, the apparatus 10 may include two or more pumps depending upon the required pump pressure and number of pipes, e.g., secondary pipe 20 and tertiary pipe 40.

The filter unit 16 is preferably in a location where it easily changed, as described above. The filter unit 16 may contain activated carbon charcoal to filter out toxins from the water. It should also incorporate a mechanical trapping filter (a mesh or similarly porous material) so that any large particles are trapped and don't get drawn into the pump unit 18. In addition, it is preferred to have a mechanical filter 16a that extends above the downstem pipe 14 outlet in the water chamber 22. This is crucial because particles of debris will naturally float. When the apparatus is turned off, the water level in the reservoir will rise due to the excess water released from the secondary pipe 20 (and tertiary pipe 40 is present). The floating debris will deposit on the inside surface 12c of the main pipe 12 if they aren't trapped below the water level 24, which would defeat the purpose of the self-cleaning water pipe 10.

If not included in the pump unit 18, the battery 28 should be installed in the base attachment 34 securely so that water cannot reach it. The type of battery is preferably a rechargeable Lithium Ion battery or similar type. The battery 28 must produce a reliably high voltage to operate the pump unit 18 with sufficient pressure, be rechargeable, and be relatively compact and lightweight in comparison to other battery types. The battery 28 may be mounted so that it stays stationary in the unit, or it can be made to be replaced so that the user does not need to wait for the unit to charge between uses.

The self-cleaning water pipe 10 described herein has a number of particular features that should preferably be employed in combination, although each is useful separately without departure from the scope and spirit of the invention. Although a preferred embodiment has been described in detail for purposes of illustration, various modifications may be made without departing from the scope and spirit of the invention. Accordingly, the invention is not to be limited, except as by the appended claims.

What is claimed is:

1. A self-cleaning water pipe, comprising:
    a main pipe having a smoke chamber with a mouthpiece at a first end and a water chamber at a second end, wherein the mouthpiece, smoke chamber, and water chamber are in fluid communication;
    a downstem pipe passing through a side wall of the main pipe, the downstem pipe having a first end adapted to receive a burn bowl and a second end in fluid communication with the water chamber;
    a filter unit in fluid communication with the water chamber;
    a pump unit in fluid communication with the filter unit; and
    a secondary pipe having a first end in fluid communication with the pump unit and a second end connected to a secondary inlet on the main pipe proximate to the mouthpiece and in fluid communication with the smoke chamber.

2. The self-cleaning water pipe of claim 1, wherein the secondary inlet is connected to the main pipe immediately adjacent to the mouthpiece.

3. The self-cleaning water pipe of claim 1, wherein the secondary inlet is connected to the main pipe at an approximately tangential angle relative to a side of the main pipe.

4. The self-cleaning water pipe of claim 3, wherein the secondary pipe is configured to inject water into the smoke chamber in a generally lateral orientation relative to a central axis of the main pipe.

5. The self-cleaning water pipe of claim 1, wherein the secondary pipe wraps around the main pipe in a helix.

6. The self-cleaning water pipe of claim 1, further comprising a tertiary pipe having a first end in fluid communication with the pump unit and a second end connected to a tertiary inlet proximate to the first end of the downstem pipe and in fluid communication an interior of the downstem pipe.

7. The self-cleaning water pipe of claim 6, wherein the first end of the tertiary pipe is connected to the secondary pipe proximate to the pump unit.

8. The self-cleaning water pipe of claim 1, wherein the pump unit is adapted to force liquid through the secondary pipe to the secondary inlet under sufficient pressure such that the liquid swirls completely around an interior surface of the smoke chamber proximate to the mouthpiece.

9. A self-cleaning water pipe, comprising:
a main pipe having a smoke chamber with a mouthpiece at a first end and a water chamber at a second end, wherein the mouthpiece, smoke chamber, and water chamber are in fluid communication;
a downstem pipe passing through a side wall of the main pipe, the downstem pipe having a first end adapted to receive a burn bowl and a second end in fluid communication with the water chamber;
a filter unit in fluid communication with the water chamber;
a pump unit in fluid communication with the filter unit; and
a secondary pipe having a first end in fluid communication with the pump unit and a second end connected to a secondary inlet on the main pipe immediately adjacent to the mouthpiece and in fluid communication with the smoke chamber, wherein the secondary inlet is connected to the main pipe at an approximately tangential angle relative to a side of the main pipe.

10. The self-cleaning water pipe of claim 9, wherein the secondary pipe is configured to inject water into the smoke chamber in a generally lateral orientation relative to a central axis of the main pipe.

11. The self-cleaning water pipe of claim 9, wherein the secondary pipe wraps around the main pipe in a helix.

12. The self-cleaning water pipe of claim 9, further comprising a tertiary pipe having a first end in fluid communication with the pump unit and a second end connected to a tertiary inlet proximate to the first end of the downstem pipe and in fluid communication an interior of the downstem pipe.

13. The self-cleaning water pipe of claim 12, wherein the first end of the tertiary pipe is connected to the secondary pipe proximate to the pump unit.

14. The self-cleaning water pipe of claim 9, wherein the pump unit is adapted to force liquid through the secondary pipe to the secondary inlet under sufficient pressure such that the liquid swirls completely around an interior surface of the smoke chamber proximate to the mouthpiece.

15. A self-cleaning water pipe, comprising:
a main pipe having a smoke chamber with a mouthpiece at a first end and a water chamber at a second end, wherein the mouthpiece, smoke chamber, and water chamber are in fluid communication;
a downstem pipe passing through a side wall of the main pipe, the downstem pipe having a first end adapted to receive a burn bowl and a second end in fluid communication with the water chamber;
a filter unit in fluid communication with the water chamber;
a pump unit in fluid communication with the filter unit;
a secondary pipe having a first end in fluid communication with the pump unit and a second end connected to a secondary inlet on the main pipe proximate to the mouthpiece and in fluid communication with the smoke chamber, wherein the secondary pipe wraps around the main pipe in a helix; and
a tertiary pipe having a first end in fluid communication with the pump unit and a second end connected to a tertiary inlet proximate to the first end of the downstem pipe and in fluid communication an interior of the downstem pipe.

16. The self-cleaning water pipe of claim 15, wherein the secondary inlet is connected to the main pipe immediately adjacent to the mouthpiece.

17. The self-cleaning water pipe of claim 15, wherein the secondary inlet is connected to the main pipe at an approximately tangential angle relative to a side of the main pipe.

18. The self-cleaning water pipe of claim 17, wherein the secondary pipe is configured to inject water into the smoke chamber in a generally lateral orientation relative to a central axis of the main pipe.

19. The self-cleaning water pipe of claim 15, wherein the first end of the tertiary pipe is connected to the secondary pipe proximate to the pump unit.

20. The self-cleaning water pipe of claim 15, wherein the pump unit is adapted to force liquid through the secondary pipe to the secondary inlet under sufficient pressure such that the liquid swirls completely around an interior surface of the smoke chamber proximate to the mouthpiece.

* * * * *